INVENTORS
CECIL E. LAND
WILLIS D. SMITH

United States Patent Office 3,702,724
Patented Nov. 14, 1972

3,702,724
FERROELECTRIC CERAMIC PLATE ELECTRO-OPTICAL LIGHT SCATTERING DEVICE AND METHOD
Cecil E. Land and Willis D. Smith, Albuquerque, N. Mex., assignors to the United States of America as represented by the United States Atomic Energy Commission
Filed Oct. 13, 1971, Ser. No. 188,880
Int. Cl. G02f 1/16
U.S. Cl. 350—160     10 Claims

ABSTRACT OF THE DISCLOSURE

An electrooptic light scattering device and method comprising a chemically prepared, oxygen hot-pressed ferroelectric ceramic plate exhibiting longitudinal electrooptic scattering effects, optically transparent electrodes disposed on opposite surfaces of the plate, means for directing light against one of the electrodes towards the other electrode through the plate, and means for electrically varying the polarization of said plate between said electrodes and the amplitude of light scattering thereat together with the amplitude of light transmitted through said plate and electrodes, including such as a photoconductive layer sandwiched between one of said electrodes and said plate.

BACKGROUND OF INVENTION

Ferroelectric ceramic materials with a multiplicity of very small domains and grains, particularly those in the lead-zirconate-titanate and lead-lanthanum-zirconate-titanate solid solution families, have been developed which exhibit electrically induced optical or electrooptic effects. It has been found in these prior polycrystalline ferroelectric ceramics that the ceramic may be given either lasting or temporary electrical polarizing properties, including pyroelectric and piezoelectric effects, under the influence of suitable electric fields. In the thermally depoled state, the ferroelectric domains within individual crystallites or grains are randomly oriented so that the ceramic is isotropic on a macroscopic scale. When a poling field is applied, domains oriented favorably with respect to the field will grow at the expense of less favorably oriented domains and result in anisotropic responses to small-signal electrical and optical stimuli. The electrooptical behavior of these polarized ceramics has been divided, in the past, into functional classes depending primarily on the grain sizes in the ceramic. Prior lead-zirconate-titanate coarse grained ceramics, that is ceramics having nominal grain sizes generally greater than about 2 microns, almost completely depolarized transmitted light and scattered the light in distinct and identifiable, spatial distributions (with maximum contrast ratios of about 30 to 1) which were dependent on whether the direction of electrical poling was in the direction of transmitted light (generally perpendicular to major surfaces of the ceramic plate) or perpendicular to the direction of transmitted light (generally parallel to the major surface of the ceramic plate and perpendicular to transmitted light direction). The coarse grained ceramics in effect switched domains from transverse orientations to longitudinal orientations. Poled fine grained ceramics, that is ceramics having nominal grain sizes generally less than about 2 microns, are birefringent and exhibit orthotropic symmetry with respect to the optic axis (the ceramic polar axis or direction of electrical poling). It was found that the light transmission characteristics of an optical network consisting of a polarizer, fine grain ceramic plate and analyzer may be changed incrementally by varying the direction of the ceramic optic axis in a plane perpendicular to a beam of polarized light passing through the network or by changing the amplitude of polarization in a particular direction in the same plane to change the intensity or wavelength of the transmitted light beam through the analyzer in multiple steps. It has also been found that the boundary between fine and coarse grained ceramics and the respective prior electrooptical behavior thereof may vary, depending upon the constituent percentages of the ferroelectric ceramic, from 2 microns to as great as 4 or 5 microns or more.

Whereas the fine grain ceramics utilized birefringence and retardation effects to achieve variations in light transmission of polarized light, the coarse grain ceramic provided light scattering distribution or patterns regardless of the polarization of the light source and would in fact substantially depolarize a polarized light source. Even though the fine grain ceramics utilized birefringence and retardation to aciheve their electrooptical effects, the prior devices have been generally limited as to thickness of ceramic plates which may be used due to some inherent, uncontrollable light scattering which may remain in a particular ceramic plate which affects the light transmission qualities of the ceramic. This uncontrollable light scattering effect in fine grain ceramics has been considered to be detrimental and a definite limiting factor on the utility and usefulness of the devices, particularly since there are applications where it is desirable to maximize the thickness of the ceramic plates to achieve certain optical effects.

The above-related electrooptical effects exhibited by ferroelectric ceramics were achieved when certain hot-pressing (sintering under pressures substantially above atmospheric pressure) techniques were developed using mixed oxide powder constituents. These hot-pressing techniques made it possible for these ceramic materials to be sufficiently transmissive to achieve the desired coarse grain and fine grain electrooptic effects. However, since the materials still exhibited light scattering effects which, in many cases, were uncontrollable electrically or otherwise and which were detrimental to the normal operation of the electrooptical device, investigations were conducted as to the causes of such light scattering. These investigations indicated that these effects were generally caused by, or appeared to be caused by, very small pores in the material (even though the normal hot-pressing techniques produced materials having greater than 99.9% theoretical density), inhomogeneities at the grain boundaries and other material impurities and inhomogeneities (even though the normal hot-pressing technique generally utilized raw material oxide powders having a chemical purity greater than about 99.2%). Because of these inherent and undesirable, uncontrollable light scattering effect of these prior materials, improved techniques have been developed to increase the purity, uniformity, homogeneity and density of ferroelectric ceramics to eliminate or minimize these uncontrollable light scattering effects. However, when improved techniques were developed which did increase material densities and decrease impurities and homogeneities, it was discovered that the resulting materials exhibit a previously unobserved electrically controllable longitudinal light scattering mode of operation.

SUMMARY OF INVENTION

In view of the above, it is an object of this invention to provide an electrooptic ferroelectric ceramic device having novel longitudinal mode, electrically induced, variable light scattering capabilities.

It is a further object of this invention to provide a ferroelectric ceramic, electrooptic device which provides maximum light transmittance in the thermally depoled state, minimum light transmittance in the electrical zero polarized state and intermediate light scattering and transmittance at intermediate electrical polarization levels parallel to the direction of transmitted light.

It is still further object of this invention to provide an electrooptical ferroelectric ceramic device which provides large aperture as well as small aperture switching capabilities.

It is a still further object of this invention to provide such switching capabilities with an electrically controlled wide range of light transmission (gray scale).

It is a further object of this invention to provide a ferroelectric ceramic electrooptical device which is easy to make and simple to operate.

Various other objects and advantages will appear in the following description of the invention, and the most novel features will be particularly pointed out hereinafter in connection with the appended claims. It will be understood that various changes in details, materials and arrangements of parts, which are herein described and illustrated in order to explain the nature of the invention, may be made by those skilled in the art within the principles and scope of the invention.

The invention comprises a hot-pressed ferroelectric ceramic plate exhibiting maximum light transmittance at the thermally depoled state and minimum light transmittance at the electrical zero polarized state with intermediate light transmittance at intermediate electrical polarization levels, an optically transparent electrode disposed on a first surface of said plate, another electrode disposed on a second surface of said plate parallel to said first surface of the plate, means for directing light against the electrode on said first surface towards the other electrode through said plate, and means for applying a voltage bias across the electrodes for varying the amplitude of light scattering in said plate.

DESCRIPTION OF DRAWING

The invention is illustrated in the accompanying drawing wherein.

DETAILED DESCRIPTION

Figure 1:
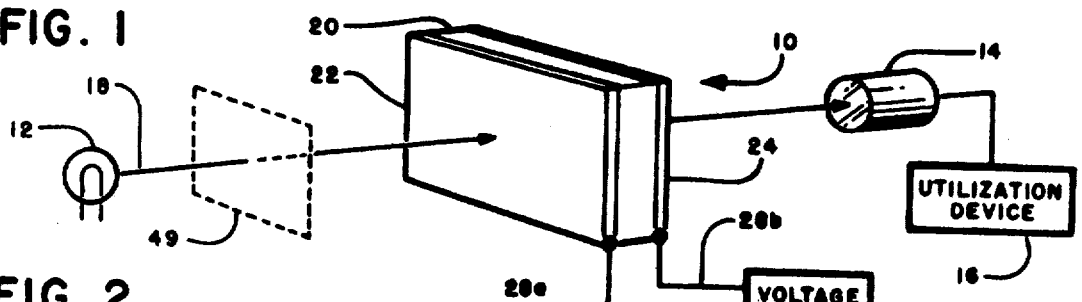
FIG. 1 is a diagrammatic view, partially in perspective, of an electrooptical device including an embodiment of a ferroelectric ceramic plate and an electrode arrangement for providing variable light scattering through the plate.

FIG. 1 illustrates one embodiment of an electrooptical device or system which utilizes the principles of this invention. In this device, a suitable ferroelectric ceramic element or member 10, to be described below, is positioned between a suitable light source 12 and photosensitive device 14 and/or a utilization device 16. Light source 12 may produce a collimated or focused light beam 18 which is directed through ceramic member 10 in the desired fashion against photosensitive device 14. Light source 12 may be any appropriate monochromatic or white light source in either an unpolarized or polarized form which will produce a beam 18 for illumination of either the entire ceramic member 10 or selected portions thereof in either a stationary or scanning mode of operation. For example, light source 12 may include a laser, an incandescent lamp or the like. Photosensitive device 14 may be one or more conventional photomultiplier tubes or photo diodes which are sensitive to ordinary light and which will produce some appropriate indication of the amplitude of light impinging thereagainst. Photosensitive device 14 may also be, for example, a screen upon which the light transmitted through ceramic plate 10 is impinged. The utilization device 16 may be any appropriate apparatus which is sensitive to any indication, electrical or otherwise, produced by photosensitive device 14 of the amplitude of light impinging on photosensitive device 14.

Ceramic member 10 includes a ferroelectric ceramic plate 20 which is prepared and formed in a desired manner described below, and which generally includes a pair of parrallel surfaces which are finished to optical quality (e.g. polished to approach optical smoothness and flatness) and which have dimensions or areas substantially greater than the distance between the major surfaces. For example, plate 20 may vary from about 0.1 to 1.0 millimeters in thickness and have a major surface area as small as desired and up to 10 centimeters sq. or more, limited only by the size of ceramic slugs that may be conveniently manufactured.

The major surfaces of plate 20, that is the surfaces through which light transmission is to be achieved, may be covered over their entirety, or over one or more selected portions thereof with optically transparent electrodes 22 and 24 on each surface. One of the electrodes may be reflective rather than transparent, if such is desired, and the light beam directed at an angle through plate 20 and the reflected light sensed by photosensitive device 14. Electrodes 22 and 24 may be applied in any manner so as to achieve the desired optical transmittance and provide a generally uniform voltage bias over all portions of the electrodes to insure a uniform electric field between the electrodes and throughout ferroelectric ceramic plate 20. The electrodes may be formed by painting, dipping or appropriate vacuum deposition techniques so long as the electrodes have the desired optical and electrical properties and may typically be formed from such materials as indium sesqui-oxide ($In_2O_3$) doped with tin oxide (SnO), or thin metallic films. An appropriate voltage bias may be applied to electrodes 22 and 24 by a suitable voltage source 26 which may be coupled by conventional leads or connectors 28a and 28b, as shown, to the respective electrodes. Voltage source 26 may be a variable amplitude voltage bias source or a constant voltage bias source which may provide voltages of either constant, pulsed or intermittent duration, depending upon the desired application of ferroelectric ceramic member 10.

Figure 2:
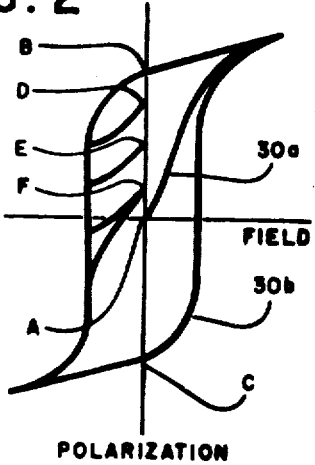
FIG. 2 is a typical graph of a polarization vs. applied electric field hysteresis loop for ferroelectric materials usable as the ferroelectric plate of FIG. 1.
Figure 3:
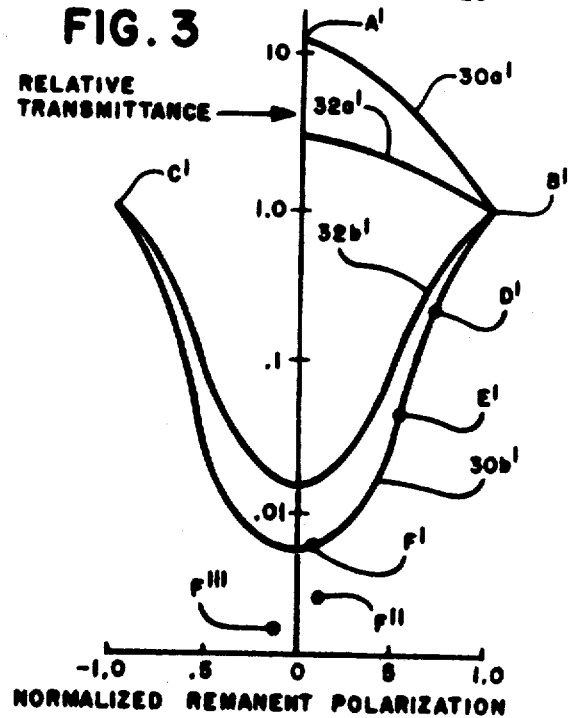
FIG. 3 is a graph in semilog scale of optical relative transmittance (in log scale) vs normalized remanent polarization curves for typical ferroelectric materials usable as the ferroelectric plate of FIG. 1 illustrating the electrically controllable, longitudinal mode light scattering characteristics of these materials in the FIG. 1 arrangement.
Figure 4:
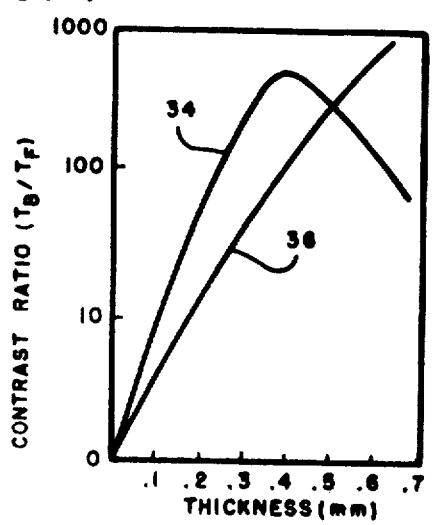
FIG. 4 is a graph in semilog scale of contrast ratio (in log scale) vs plate thickness showing curves for two ferroelectric ceramic materials prepared by different techniques.

The ferroelectric ceramic plate 20, in accordance with this invention, is made from appropriate materials in a suitable manner to exhibit the desired properties illustrated in FIGS. 2 and 3. FIG. 2 shows the polarization hysteresis loop and typical remanent polarization properties while FIG. 3 shows the relative light transmittance vs. normalized remanent polarization properties of typical materials of this invention. With the ceramic plate in its initial, thermally depoled or unpoled state, the polarization of chemically prepared-oxygen hot-pressed material (described below) is at location A of FIG. 2 and relative transmittance at A' of FIG. 3 and it exhibits maximum transmittance and minimum light scattering at levels dependent on the particular material sample. (Mixed oxide powder prepared-oxygen hot-pressed ferroelectric ceramic material exhibits somewhat lower relative light transmittance and contrast ratios for devices of similar arrangement, as shown by curves 32a' and 32b' of FIG. 3.) As an electric field is applied through ceramic plate 20 between the major surfaces thereof, such as between the electrodes 22 and 24 by voltage source 26, the ferroelectric ceramic will assume an electrically induced polarization along a typical line 30a of FIG. 2 with increasing applied field and will exhibit decreasing optical transmittance along a line similar to that shown by line 30a' of FIG. 3 until the material reaches saturation remanence. When the voltage bias is removed, the polarization relaxes to a remanent state at saturation remanence B of FIG. 2 and exhibits an optical transmittance level corresponding to point B' of FIG. 3. If the polarity of the applied voltage is reversed, the ceramic polarization may be switched to a negative saturation remanent state at point C of FIG. 2 around the polarization vs. electric field hysteresis loop 30b. As this is achieved, the optical transmittance will decrease along line 30b' of FIG. 3 through a minimum or near zero transmittance level and then increase again to point C' which is approximately equal in amplitude to point B'. The light scattering within ceramic plate 20 increases and decreases in a manner inversely proportional to the illustrated transmittance change. If, beginning again at point B of hysteresis loop 30b in FIG. 2, the reverse polarity applied voltage is increased to some level and then removed, the polarization of ceramic plate 20 may relax to some intermediate point between saturation remanence at B or C, such as at points D, E, or F, depending upon the level of the voltage and time when it is removed. At each of these remanent positions, the amplitude of optical transmittance will be stabilized at an appropriate location indicated by points D', E', and F' on curve 30b' of FIG. 3. With the ferroelectric ceramic material at a remanent polarization level, the material will stay indefinitely at that polarization level, and consequent optical transmittance level, without any power applied thereto, until some polarity of applied electric field is produced or initiated between the electrodes 22 and 24 of sufficient amplitude and duration to switch the ceramic material to a different remanence level. By proper selection of voltage amplitude and duration, the material can be brought to a near electrical zero remanence state and minimum optical transmittance, such as illustrated by point F of FIG. 2 and F' of FIG. 3 (during certain polarization cycles, the minimum contrast ratio may be decreased to such as points F'' and F''' in FIG. 3 which still correspond to zero polarization point F of FIG. 2). Likewise, the material can be polarized to any number of a plurality of positive or negative remanent polarization levels by appropriate selection of voltage amplitudes and durations. Each level of remanent polarization is equivalent to some level of optical transmittance through the ceramic plate 20 which is indicative of the amount of light scattering within the plate, thus producing a gray scale of optical light transmittance. The contrast ratio for this device is defined as the ratio of the maximum to minimum transmittances in the electrically poled status, that is the ratio of optical transmittance at point B' or point C' to the optical transmittance at such a point as F' of FIG. 3. With typical ferroelectric ceramic materials with desired plate thickness, contrast ratios of greater than 500 to 1 with substantially continuous and linear or stepped gray scale therebetween may be achieved. As the thickness of the ferroelectric ceramic plate is increased, the contrast ratio, that is the ratio of transmitted light amplitude at saturation polarization remanence to the transmitted light amplitude at electrical zero polarization, is increased, although with decreased image resolution or focus. If the thickness if increased sufficiently, inherent uncontrollable scattering in the plate may become predominant and limit the contrast ratio which may be achieved with continued decrease in image resolution. This is illustrated in FIG. 4 by curve 34 for PLZT 7/65/35, which was chemically prepared and oxygen hot-pressed, and by curve 36 for PLZT 7/65/35, which was mixed oxide powder prepared and oxygen hot-pressed, which correspond to the material properties shown in FIG. 3.

This controllable, longitudinal electrooptic scattering effect of increasing or decreasing light scattering and optical transmittance is indicated to be due to the accompanying changes in the number of strain producing and/or relieving 71° and 109° domain reorientations which predominate in the ceramics of this invention. When polarized light is used to impinge against the ferroelectric ceramic member, the transmitted light through the plate is only partially depolarized from the original polarization by this light scattering. A relatively large number of these particular domain orientations are present for a relatively broad range of remanent polarization values near zero remanent polarization as indicated by the broad transmittance minimum in FIG. 3.

As can be seen from FIGS. 2 and 3, the change in optical transmittance of the ferroelectric ceramic plate 20 may be achieved in a plurality of separate stable steps or in a continuous manner from the electrical zero to saturation remanence levels as well as from the thermally depoled state. It is also apparent that the chemically prepared, oxygen atmosphere hot-pressed material exhibits greater contrast ratios with thinner material (better resolution) than the mixed oxide powders, oxygen atmosphere hot-pressed materials.

The ferroelectric ceramic plate 20 may be any ferroelectric ceramic solid solution which exhibits the above properties. It has been found that particularly useful ferroelectric ceramic solid solutions are those lead-lanthanum-zirconate-titanate solid solutions of rhombohedral symmetry within individual grains having the general formulas $Pb_{1-x}La_x(Zr_yTi_z)_{1-x/4}O_3$ (hereinafter referred to as PLZT), where $x$ is between about 5 and about 8 atom percent with a ratio of $y/z$ from about 60/40 to about 80/20 which are prepared in accordance with the following chemical preparation and oxygen atmosphere hot-pressing technique or by mixed oxide powders and oxygen atmosphere hot-pressing technique. The compositions will be referred to typically as PLZT with three numbers, such as PLZT 7/65/35, with the numbers designating atom percent of La, Zr and Ti, respectively.

These ferroelectric ceramic compositions may be formed by first preparing proper liquid alkoxides or other alcohol soluble metallic compound solutions of the respective lead, lanthanum, zirconium and titanium constituents. For example, lead oxide, zirconium alkoxide, titanium alkoxide and lanthanum acetate may be used. Also, various combinations of solutions and oxide powders may be prepared and suitably mixed together, if such is desired. The various alkoxides or soluble metallic compound solutions or powders are then mixed in desired proportions and sequence to achieve the final product constituent percentage. The mixed liquids are then hydrolyzed to precipitate out the ferroelectric ceramic oxide constituents. If it is desired, as mentioned above, some constituents may be added as an oxide powder to the mixed liquids of the other constituents as the liquids are being rapidly stirred to achieve a complete uniform mixing of all the ingredients prior to the precpitation step. If the liquids and other materials are prepared in the proper manner and thoroughly mixed with selective constituent amounts, the precipitated material will be in the proper atom percent ratios to achieve the desired ferroelectric ceramic product. For example, mixing of 260 grams of lead oxide powder with 339.43 grams of 28.5% zirconium tetrabutoxide and 142.62 grams of 23.7% titanium tetrabutoxide with 700 millimeters of isopropyl alcohol in a blender for about 1 minute and then while continuing to mix injecting 214.68 grams of 6.54% lanthanum acetate mixed with 130 milliliters of water into the mixture which hydrolizes the alkoxides to form a precipitate and slurry which produces about 400 grams of PLZT 7/65/35.

The precipitated material and slurry of mixed hydroxides (or an appropriate slurry of oxide powders for all constituents in a well known manner) may then be appropriately dried, such as by freeze drying or the like, ground into a powder and the resulting powder heated under oxygen or air at temperatures from about 300° C. to 600° C. for about 1 to 24 hours. The resulting treated material may then be granulated or wet ball milled to break down any partially sintered or agglomerated particle aggregates, the wet milled material further dried and the dried powder cold compressed into a slug. The slug may then be further processed by hot-pressing at a temperature of from about 800° C. to about 1300° C. for about 1 to about 64 hours at pressures from about 500 to 20,000 p.s.i. in an oxygen atmosphere with oxygen flow rate of about 5 cubic feet/hour. The hot-pressing may be carried out in appropriate hot-pressing apparatus with oxygen provided at all times during the hot-pressing by flowing the same about the slug in the hot-pressing furnace. The grain size may be controlled by maintaining high chemical purity and by proper selection of hot-pressing conditions of temperature, time and pressure. After hot-pressing the finished slug may be sliced into thin wafers or plates and the major surfaces polished to an optical quality finish. The plates may then be annealed at from about 500 to about 700° C. for about 15 minutes, cooled to room temperature, and the appropriate electrodes positioned or plated thereon and the plate poled to a desired initial polarization.

It has been found that without the initial chemical preparation of the material from a mixture of liquid alkoxides, oxide powders, and alcohol soluble metallic compound solutions and oxygen hot-pressing (or the use of specific mixed oxide-oxygen hot-pressed materials) the resulting ferroelectric ceramic materials do not exhibit the desired electrically controllable light scattering properties illustrated in FIGS. 2 and 3, or they are of such reduced value as to be of limited or no practical utility.

The ferroelectric ceramic should be prepared so as to have a grain size of from about 3 to 8 or more microns and the wafers or plates prepared to have a finished optical quality thickness of from about 0.1 to about 1.0 millimeters. The grain size is preferably above some level which will produce the desired light scattering properties shown in FIG. 3, the grain size boundary at which this begins to be predominant depending somewhat on the material constituents and on the material preparation technique used. The following table, together with FIG. 4, illustrates the thickness dependence of contrast ratio and resolution for typical PLZT 7/65/35 ferroelectric ceramics which were either chemically prepared and oxygen hot-pressed in accordance with the above described process or prepared using mixed oxides and oxygen hot-pressed.

| Thickness, mm.: | Chemically prepared contrast ratio, $T_B/T_C$ | Mixed oxide prepared contrast ratio, $T_B/T_C$ | Estimated line resolution, line pairs/mm. |
|---|---|---|---|
| .125 | 11 | 4 | 40-50 |
| .250 | 143 | 25 | 40 |
| .375 | 526 | 67 | 30 |
| .500 | 286 | 400 | 20 |
| .625 | 102 | 833 | 10 |

A PLZT 7/62/38 plate .25 millimeter thick exhibited a contrast ratio of 173. The image resolution in these devices exhibits orthotropic symmetry in the plane of the ferroelectric plate.

Figure 5:
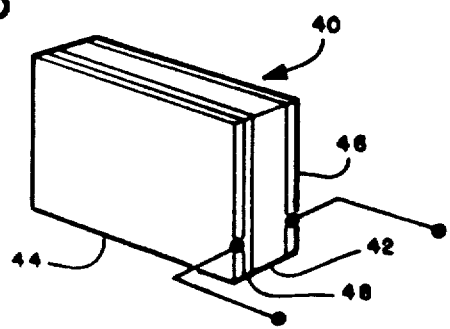
FIG. 5 is a perspective view, with exaggerated dimensions, of another embodiment of a ferroelectric ceramic element which may be used in the arrangement of FIG. 1.
Figure 6:
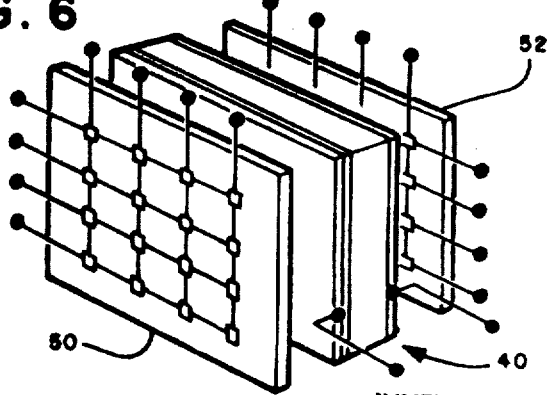
FIG. 6 is a somewhat diagrammatic and perspective view of still another embodiment of this invention.

Images may be stored in ferroelectric ceramic members 10 and 40 with voltage biases or pulses of amplitudes of about 6 to 20 kilovolts per centimeter thickness of the ferroelectric ceramic plate with pulse durations of $10^2$ to $10^7$ microseconds, depending upon material composition and, for embodiments of FIGS. 5 and 6, the light amplitude impinging against the ferroelectric member. For example, for PLZT 7/65/35, pulse amplitudes of about 12 kilovolts per centimeter may be used with appropriate durations to achieve switching of polarization from one stable state to another.

A particularly useful embodiment of the ferroelectric ceramic member may be in the form shown in FIG. 5 by member 40. In this embodiment, ferroelectric ceramic member 40 includes a ferroelectric ceramic plate 42, prepared as described above, having electrodes 44 and 46 disposed on opposite major surfaces thereof in the same manner as electrodes 22 and 24 on plate 20 of FIG. 1. In addition, a photoconductive film 48 is disposed or sandwiched between one of the electrodes, such as electrode 44, and ferroelectric ceramic plate 42. With ferroelectric ceramic member 40 substituted for member 10 of FIG. 1 and a voltage applied to electrodes 44 and 46 by voltage source 26, the photoconductive film 48, because of its normal high resistance, will prevent or minimize the polarization of ferroelectric ceramic plate 42 when the device is being subject to low amplitude light or no light at all. If the light source 12 is turned on and light beam 18 impinged against electrode 44 and film 48, the film 48 will become conductive in proportion to the intensity or amplitude of the light beam 18 impinging thereagainst at any and all locations. Ferroelectric ceramic plate 42 will likewise then be poled or switched in proportion to the amplitude of light beam 18 at locations corresponding with the location of impingement of light beam 18 on photoconductive film 48 in alignment with the direction of an applied electric field. If light beam 18 is a spot source of light, it may be scanned across electrode 44 in any appropriate pattern, such as a raster, with either constant or varying amplitude, so as to polarize the respective locations of ferroelectric ceramic plate 42 to levels of polarization corresponding with the amplitude of light beam 18 at each location. If the voltage is removed from electrodes 44 and 46, the "image" or polarization levels of each location then induced in ferroelectric ceramic plate 42 will remain. If the plate is again illuminated by light beam 18 or any other light beam or light source, the "image" may be projected against photosensitive device 14 or any other suitable light sensitive means and the image directly observed or measured. Such an image may be stored in ferroelectric ceramic plate 42 indefinitely and the image later changed by further scanning with light beam 18 while applying an appropriate bias to electrodes 44 and 46 or by uniformly illuminating electrode 44 and photoconductive layer 48 while applying an appropriate bias to the electrodes.

The photoconductive layer may be any transparent photoconductive film, such as polyvinyl carbazole, cadmium sulphide (CdS) or zinc selinide (ZnSe).

An image may be stored in ferroelectric ceramic plate 42 simultaneously over the entire area of the plate by simultaneously illuminating the entire electrode 44 and photoconductive film 48 while applying an appropriate bias between the electrodes and positioning a suitable transparent image carrying film 49 between light source 12 and ferroelectric ceramic member 40. The image film 49 may, for example, be any conventional photographic negative or positive. Ferroelectric ceramic plate 42 will be polarized at different levels of polarization at different locations thereof corresponding to the variations in gray scale of film 49. When later illuminated without the presence of a voltage bias, the ferroelectric ceramic member 40 will include an image corresponding with that on film 49 which may be projected against photosensitive device 14.

If the ferroelectric ceramic plate 42 is first poled to positive saturation remanence by illuminating the entire photoconductive film 48 so that it becomes conductive uniformly throughout while simultaneously applying a voltage or voltage pulse to the device terminals and electrodes 44 and 46, the plate will be polarized to a position represented by B in FIG. 2 and exhibit a transmittance indicated by B' in FIG. 3. After poling, the voltage may be removed and the image to be stored, such as an image on a film 49, positioned and focused so as to impinge against photoconductive film 48 while a voltage or voltage pulse of reverse polarity is applied to the electrodes 44 and 46. To achieve maximum contrast ratio, this reverse voltage should be at least about ½ the magnitude of the original poling voltage. Image storage time may be dependent on light intensity at the photoconductive film 48 and the amplitude of the voltage bias or pulse, with storage time decreasing with both increasing light intensity and pulse amplitude. If too large a pulse amplitude or bias is used, the polarization direction may be reversed causing the material to fall to the left hand side of curve 30b' of FIG. 3 and prevent proper storage of the image. Thus, the areas of maximum illumination should be switched to the electrically depoled state, position F in FIG. 2 and F' in FIG. 3 by controlling the voltage pulse with amplitude and/or the exposure time. After storage of the image, the image may be observed or measured by projection on a viewing screen or photosensitive device 14 by using either transmitted or reflected light. With such an arrangement, if film 49 will photographic negative film, the ceramic plate 42 will store a positive image.

The ferroelectric ceramic plate 42 may also be initially polarized uniformly to near electrical zero, such as at position F of FIG. 2 and F' in FIG. 3 in the same manner as described above by suitable selection of poling voltage polarity and amplitude and by uniform illumination of the entire photoconductive film 48. The image to be stored may be then focused on photoconductive film 48 while a voltage pulse or bias of either polarity is applied to electrodes 44 and 46. After image storage, the voltage pulse or bias may be removed and the ferroelectric ceramic member 40 appropriately illuminated to measure or observe the stored image, which in this case may be a negative image from a negative photographic image. Negative and positive images may also be produced, with appropriate operation, from positive images.

It will be apparent that the image may be continuously modified and simultaneously observed or otherwise measured or sensed by appropriate light scanning techniques using intensity modulated light beams with storage voltage bias applied to store an image at a point or line at a time. Such may be used to transmit images on communications channels, such as by the storage of documents or photographs with sweep synchronization and intensity modulation transmission over ordinary telephone channels.

Erasure of an image may be accomplished at any time by uniformly illuminating the entire ferroelectric ceramic member 40 while applying a voltage bias of appropriate polarity, amplitude and duration to switch the ceramic to the saturation remanence and then, if desired, to the zero polarization remanence state. In addition, selective erasure of parts of the storage image may be accomplished by illuminating only those parts to be erased while applying erasure biases.

The ferroelectric ceramic device illustrated in FIG. 1, with the ferroelectric ceramic member 10 or ferroelectric ceramic member 40, may be used in a wide range of applications. For example, a device using member 40 may be interposed between the lens and film of a photographic camera and the image first stored in the ferroelectric ceramic device. The stored image, either a positive or negative image, may then be examined for picture quality and content and if it meets a desired standard, subsequently stored on the camera film or erased, as desired. Thus, an image of an event or the like could be examined before deciding if a photographic film record of the same would be desirable.

In addition, the ferroelectric ceramic devices may be used as shutters, matrix-addressed optical memories, page composers for holographic memories, etc., by fabricating the ferroelectric ceramic member with or without the photoconductive film and/or by using patterns or arrays of transparent electrodes.

The ferroelectric ceramic device may also be used as a content-address memory which is addressed by coincidence between an external key and contents of a word memory as shown in FIG. 5. The memory system uses a matrix array of light emitting diodes 50 (shown schematically), a ferroelectric ceramic member 40 described in FIG. 4, and matrix array of photo diodes 52 (shown schematically) which corresponds in configuration to the light emitting diodes. Ferroelectric ceramic member 40 may be switched at locations corresponding with the position of the light emitting diodes to an on or off state between positions B' and F' of FIG. 3 with application of suitable voltage bias to the electrodes of member 40. Binary information can therefore be "written into" ferroelectric ceramic member 40 a word at a time by coincidentally addressing appropriate terminals of the light emitting diode array 50 and the information read out either word or bit at a time by similar addressing of light emitting diode array 50 by observing the output of a corresponding row or individual photodiode of photodiode array 52.

It has been found that a ferroelectric ceramic plate having an image stored thereon will age over a period of days and will resist erasure of the image. If erasure is attempted, upon removal of the normally adequate erasure bias, the plate will return to its stored image polarization level unless the plate is cycled through several polarization loops. After such cycling, new images and ready erasure thereof may be achieved. This aspect may minimize accidental erasure of stored images until a more positive action to erase is taken.

What is claimed is:

1. An electrically induced variable light scattering device comprising an oxygen atmosphere hot-pressed ferroelectric plate with grain sizes greater than about 3 microns having oppositely disposed first and second optical quality surfaces of substantially greater dimension than the cross section between said surfaces, said ferroelectric ceramic plate exhibiting minimum light scattering and maximum light transmittance in the thermally depolarized state and maximum light scattering and minimum light transmittance in the electrical zero polarized state with intermediate light scattering and light transmittance at intermediate electrical polarization levels generally proportional to said intermediate polarization levels; an optically transparent electrically conductive electrode disposed on said first plate surface; an electrically conductive electrode disposed on said second plate surface at a location in alignment through said plate with said transparent electrode; means for directing light against said transparent electrode toward said other electrode through said plate; and means for applying an electric bias across and a longitudinal electric field between said electrodes and for varying the number of 71° and 109° domain orientations to change the amplitude of scattering in said plate and the amplitude of light transmitted through said plate.

2. The device of claim 1 including means for sensing the amplitude of light transmitted through said plate at said electrode location as said transmitted light leaves said plate.

3. The device of claim 1 including an optically transparent photo-conductive film sandwiched between said transparent electrode and said ceramic plate.

4. The device of claim 1 wherein said electrode on said second surface of said plate is optically transparent.

5. The device of claim 1 including a plurality of electrodes on each of said surfaces of said ferroelectric ceramic plate arranged in pairs in alignment through said plate.

6. The device of claim 1 wherein said ferroelectric ceramic plate is a lead-lanthanum-zirconate-titanate solid solution of rhombohedral symmetry within individual grains.

7. The device of claim 6 wherein said ferroelectric ceramic plate is formed by chemical co-precipitation of constituent hydroxides with lead oxide powder and is about .1 to about .4 millimeter thick.

8. The device of claim 6 wherein said ferroelectric ceramic plate formed from mixed oxide powders is from about 0.2 to about 1 millimeter between said surfaces.

9. The device of claim 1 wherein said ceramic plate has a plurality of stable remanent states between zero electrical polarization and saturation remanence polarization and said applying means includes means for switching said plate to said plurality of states.

10. A method of varying the light scattering of a ferroelectric ceramic plate having minimum light scattering and maximum transmittance in the thermally depoled state and maximum light scattering and minimum transmittance in electrical zero polarized state with intermediate light scattering and transmittance at intermediate electrical polarization levels comprising directing light through said plate in a given direction; applying an electrical field to said plate in said direction of said light; and varying the amplitude and duration of said electric bias polarizing said plate in the direction of said light to levels of polarization and light scattering corresponding to said electric bias amplitude and duration.

References Cited

UNITED STATES PATENTS 3,499,704   3/1970   Land et al.

DAVID SCHONBERG, Primary Examiner

P. R. MILLER, Assistant Examiner

U.S. Cl. X.R.

340—173.2; 350—150